(No Model.) 2 Sheets—Sheet 1.

O. H. FIELD.
SULKY PLOW.

No. 311,736. Patented Feb. 3, 1885.

WITNESSES

INVENTOR
O. H. Field
by Anderson & Smith
his ATTORNEYS

N. PETERS. Photo-Lithographer, Washington, D. C.

(No Model.) 2 Sheets—Sheet 2.
O. H. FIELD.
SULKY PLOW.
No. 311,736. Patented Feb. 3, 1885.
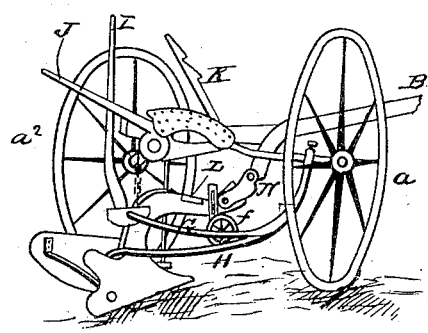
Fig. 3.
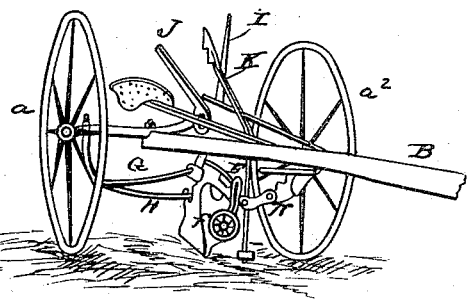
Fig. 4.
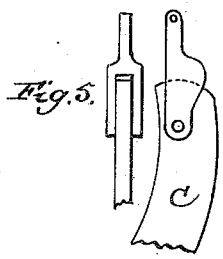
Fig. 5.
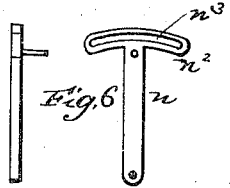
Fig. 6.
Fig. 7.
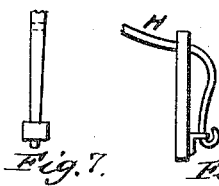
Fig. 8.
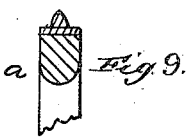
Fig. 9.
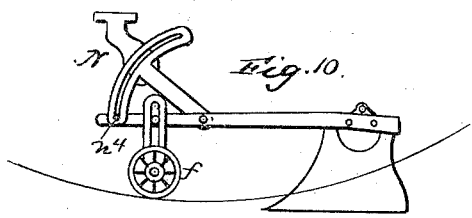
Fig. 10.
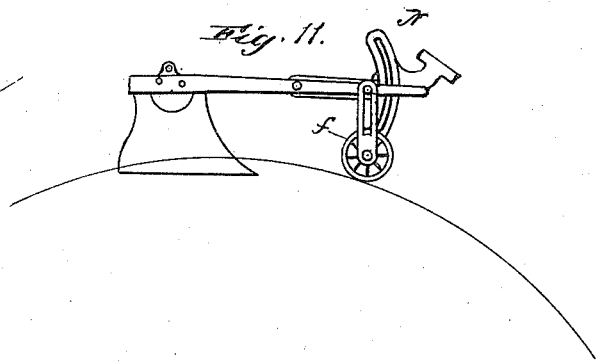
Fig. 11.
WITNESSES
E. H. Bates
P. C. Masi
INVENTOR
O. H. Field
by Anderson & Smith
his ATTORNEYS

UNITED STATES PATENT OFFICE.

OSMOND H. FIELD, OF KIANTONE, NEW YORK.

SULKY-PLOW.

SPECIFICATION forming part of Letters Patent No. 311,736, dated February 3, 1885.

Application filed July 12, 1884. (No model.)

*To all whom it may concern:*

Be it known that I, OSMOND H. FIELD, a citizen of the United States, residing at Kiantone, in the county of Chautauqua and State of New York, have invented certain new and useful Improvements in Sulky-Plows and Attachments; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
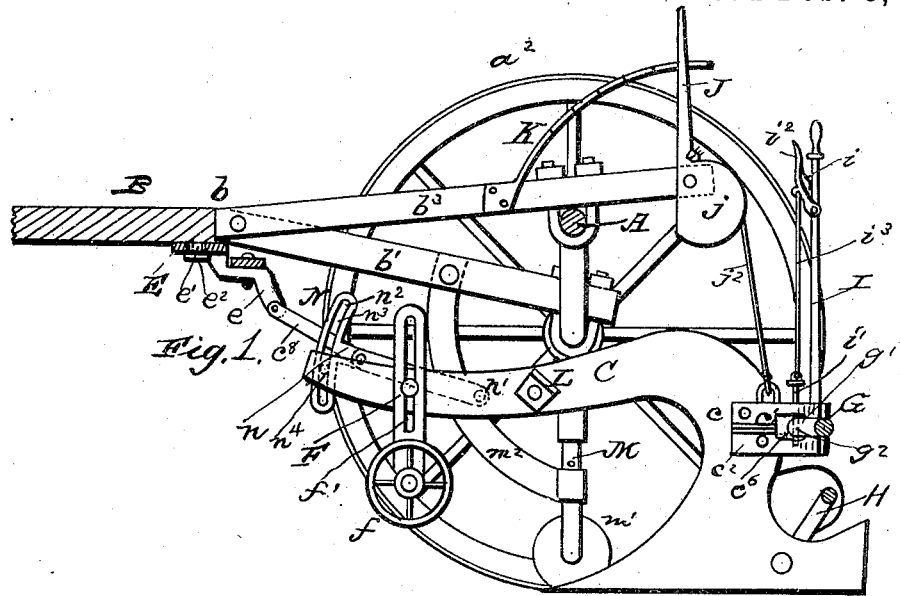
Figure 2:
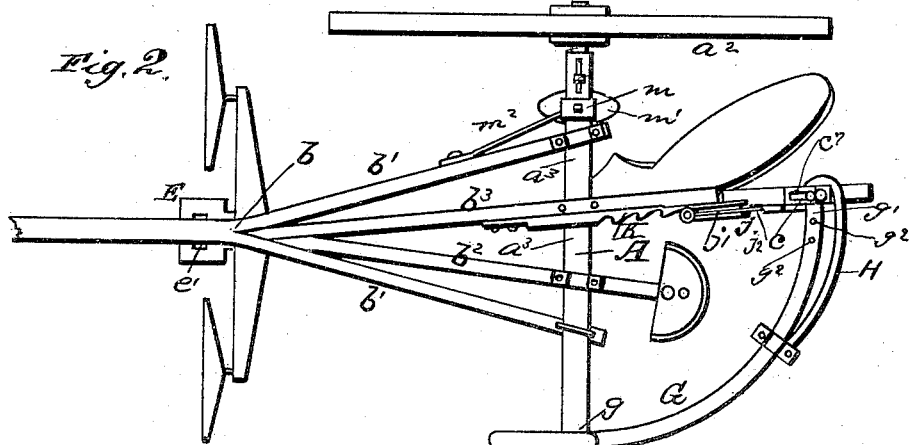
Figure 14:
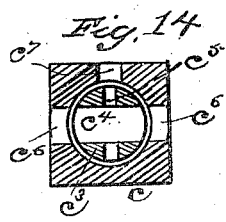
Figure 12:
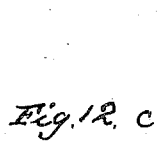
Figure 13:
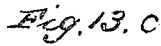
Figure 15:
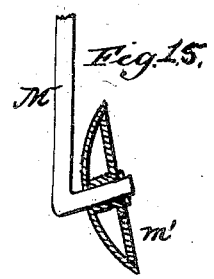

Figure 1 of the drawings is a vertical sectional view of my device. Fig. 2 is a plan view. Figs. 3 and 4 are perspective views. Figs. 5, 6, 7, 8, and 9 are detail views. Figs. 10 and 11 are side views, and Figs. 12 and 13 are also detail views. Fig. 14 is a cross-sectional view of Fig. 13, and Fig. 15 is a sectional view of the wheel $m'$ and its bearing.

This invention relates to that class of plows the points of which are made adjustable to suit the varying inclination of the ground; and its object is to so construct and connect the beam and tongue that the heel of the plow may, when passing over a hollow, be raised and held in proper height to cut the furrow the requisite depth. A further object is to make the plow capable of being readily inclined laterally to either side, so that the plow-point may engage the ground perpendicularly when plowing upon the side of a hill.

The invention consists in the construction and novel arrangement of devices, as will be hereinafter more fully set forth, and particularly pointed out in the claims appended.

In the accompanying drawings, A represents the axle of a plow, having attached on its land-side end the wheel $a$, which may have around its periphery the flange or rib $a'$, to hold in the soil, and on the opposite end with the wheel $a^2$. The axle A has the part $a^3$ nearest to the wheel $a^2$ curved upward, to afford sufficient space for the proper operation of parts actuated below.

B is the tongue of the plow, dividing at the point $b$ into two lateral arms, $b'$ $b'$, which extend horizontally backward, and have their ends fixed to the axle, one on each side of the bend $a^3$.

$b^2$ is an arm extending backward from between the arms $b'$ $b'$, inclining slightly toward the landside of the plow, and having the seat attached to its rear end back of the bend $a^3$, over which said arm passes, and to which it is fixed.

$b^3$ is an arm extending similarly backward from between the arms $b'$ $b'$, inclining slightly toward the wheel $a^2$, and having its rear end vertically over the rear curve of the plow-beam.

C is the plow-beam, having the plow-point and mold-board properly attached, and provided with the extension $c$ at the point where it curves downward to the rear. The extension $c$ is made in two parts, one, $c'$, fitting horizontally over the other, $c^2$, and bolted thereto. These two parts have between them a longitudinal circular opening, in which slides the cylinder $c^3$, which is provided with a horizontal transverse opening, $c^4$, and a vertical opening, $c^5$, descending into $c^4$.

$c^6$ is a longitudinal slot in the extension $c$, and is in line with the opening $c^4$ of the cylinder; and $c^7$ is a longitudinal opening in the top of the same extension above $c^5$, and extending some distance to rear of said opening.

$c^8$ is a link connecting the front end of the plow-beam to a rear projection of the head-block E, to which are fixed proper trees for the attachment of the traces. The link $c^8$ is pivoted to the plow-beam, and to a rear projection, $e$, of the head-block by its front and rear end, respectively. The head-block E is furnished with the transverse slot $e'$, by which it is attached to the lower surface of the tongue by the aid of a proper set-bolt, $e^2$.

F is a rod descending vertically from the front portion of the beam, and having pivoted to its lower end the vertical wheel $f$, which governs the depth of the furrow. The upper end of the rod F is vertically adjustable upon the plow-beam by means of the slot $f'$ and proper set-screw.

G is a brace loosely attached in any proper manner by its outer end to the axle at a point, $g$, near the wheel $a$. The said brace curves forward and downward and then backward and inward, so as to have its inner end, $g'$, pass through the slot $c^6$ and enter the horizontal opening $c^4$ in the cylinder $c^3$, the said inner end having through it the vertical opening $g^2$.

Several holes, $g^2 g^2$, may be made in the brace, by means of which the plow may be secured in a position more or less inclined to that side.

H is a lower curved brace, having its outer end secured to the middle of the brace G, and its inner end fixed to the heel of the plow or to the beam above said heel.

I is a rod rising vertically through the slot $c^7$, from the upper surface of the cylinder $c^3$ to the rear of the vertical opening $c^5$; and $i'$ is a pin which enters the opening $c^5$, and is forced by the spring $i$ to engage the vertical opening $g^2$ in the end of the brace G, thus retaining the said inner end within the opening $c^4$ when desirable. By means of the rod I the driver may incline the plow to either side when the brace G is detached from the heel of the same.

$i^2$ is a short lever, pivoted to the rod I at any convenient point near the upper end of the latter, and having its lower end connected by a link or chain, $i^3$, with the upper end of the pin $i'$. By means of the said lever and connection $i^3$ the pin $i'$ may be disengaged from the end of the brace G and the latter released from its connection with the plow.

J is a lever pivoted at its lower end to the side of the rear end of the arm $b^3$, from which it stands upward, and having fixed to its pivot the vertical eccentric wheel $j$, which is provided around its periphery with the groove $j'$.

$j^2$ is a cord or chain, which is fixed by one end to the lower part of the lever $j$, and, passing thence over the eccentric wheel in the groove, has its other end attached at any proper point to the upper edge of the rear of the plow-beam.

K is a rack or other suitable detent, fixed to the arm $b^3$ at a proper point to engage and hold between its teeth the lever $j$ in any desired position. By means of said lever and rack, in connection with the eccentric wheel and cord $j^2$, the heel of the plow may be lifted and held at any desired height.

L is a foot-rest or stirrup, fixed to the beam of the plow, by bearing his weight upon which the driver may force the point of the plow deeper into the soil when the nature of the ground requires it. This action may be used in addition to lifting the heel of the plow, and would become necessary when the wheels of the plow were lifted, as in going over a large stone.

M is a rod sliding on and depending from the axle, near the wheel $a^2$, by means of the thimble $m$, and carries a proper furrow-wheel, $m'$; and $m^2$ is a brace for said rod, fixed by its upper end to the arm $b'$ nearest the wheel $a^2$. The wheel $m'$, which is laterally adjustable on the axle, runs in the furrow with its convex side against the land side of the same, thus gaging the plow to cut no wider than the gage-wheel $m'$ is set for. The standard carrying the wheel $m'$ being adjustably secured to the axle by means of a set-screw or the like passing through the thimble M to the said axle, the wheel may be gaged laterally with relation to the plow and a furrow cut of any desired width.

N is the attachment of the plow-beam to the tongue, composed of the longitudinal arm $n$, pivoted by its rear end, $n'$, to the beam a little distance behind the governing-wheel $f$, and the vertical piece $n^2$ curved in the arc of a circle, (the center of which is the pivot-point $n'$,) and provided with the similarly-curved longitudinal slot $n^3$. The said slot travels over the pin $n^4$, fitting into it and fixed to the side of the beam near its front end.

$c^8$ is an arm fixed to and descending from the lower surface of the tongue, and pivoted to the outer end of the arm $n$ in such manner as not to interfere with the travel of the piece $n^2$ and slot $n^3$ over the pin $n^4$.

By this device, or by the formerly-described attachment of the beam and tongue, the front end of the former will incline itself properly to the latter when the heel of the plow is raised, as above described. It will also incline itself to suit different heights of the adjustable wheel $f$.

The operation of the several parts of the invention is as follows: The governing-wheel $f$ being set for a furrow of desired depth, when the point of the plow is about to descend into a hollow, its heel is raised by means of the lever J, eccentric wheel $j$, and chain $j^2$, the point of the plow being consequently depressed and entering farther into the soil. In this case the brace G remains attached to the plow, so as to keep the same vertical to the soil, and the driver must be careful to lift the heel of the plow just sufficiently to keep the point at an equal depth beneath the surface of the soil to that to which it would enter on level ground with the governing-wheel set in the same position.

When, while plowing along the side of a hill, it is desired to set the plow vertical to the surface of the soil, the driver, by means of the lever $i^2$ and the chain or link $i^3$, lifts the pin $i'$, so as to disengage the end of the brace G from the plow, which may then be inclined to either side by the driver pulling in a proper direction upon the upright I. Upon letting go the lever $i^2$ the curved spring $i$ returns the pin $i'$ and again secures the brace G to the plow.

Having described my invention, what I claim as new, and desire to secure by Letters Patent, is—

1. In a plow, the combination, with the axle A, tongue B, attached to the same, and beam C, provided with rear projection, $c$, (the said tongue and beam being connected at the front end of the latter by a vertically-adjusting joint,) of the cylinder $c^3$, braces G and H, rod I, provided with spring $i$, pin $i'$, lever $i^2$, and connecting chain or cord $i$, substantially as specified.

2. In a plow, the combination, with the axle A and tongue B, secured thereto, of the arm N, having slotted cross-head $n^2$, plow-beam C, with pin $n^4$, link $c^3$, and head-block E, having the rear projection, as shown and set forth.

3. In a plow, the combination, with the tongue and axle, of the sleeve $m$, adapted to be laterally adjusted upon the said axle, the standard M, having its lower end provided with the inclined bearing, the gage-wheel $m'$ arranged thereon, and the upper portion of the said standard passing through the sleeve, whereby the gage-wheel may be allowed to rise and pass over obstructions, substantially as specified.

In testimony whereof I affix my signature in presence of two witnesses.

OSMOND H. FIELD.

Witnesses:
 GEO. S. GIFFORD,
 W. R. BOTSFORD.